United States Patent [19]

Perry

[11] 4,208,086
[45] * Jun. 17, 1980

[54] THREE-DIMENSIONAL PROJECTION SYSTEM

[76] Inventor: Lawrence M. Perry, 417 Julia St., Apartment #102, Huntsville, Ala. 35805

[*] Notice: The portion of the term of this patent subsequent to Mar. 17, 1995, has been disclaimed.

[21] Appl. No.: 690,915

[22] Filed: May 28, 1976

[51] Int. Cl.² .............................................. G02H 1/22
[52] U.S. Cl. ...................................... 350/3.85; 350/9; 350/167; 350/175 E
[58] Field of Search .................... 350/3.5, 9, 128, 167, 350/175 E

[56] References Cited
U.S. PATENT DOCUMENTS

| | | |
|---|---|---|
| 2,018,592 | 10/1935 | Arnulf .............................. 350/167 X |
| 2,351,034 | 6/1944 | Gabor .................................. 350/167 |
| 3,632,181 | 1/1972 | Lee ........................................ 350/3.5 |

Primary Examiner—Edward S. Bauer
Attorney, Agent, or Firm—C. A. Phillips

[57] ABSTRACT

A projection system for providing a magnified image from a holographic transparency in which the transparency is illuminated from one side by a laser, and two lens are serially arranged on the other side of the transparency, the second of these lens having a focal length greater than the first one. An Arnulf afocal plate closely follows serially the second of the lens. A viewer in front of the afocal plates perceives a three-dimensional real image positioned between the viewer and the afocal plate, which image is a magnified and dimensionally correct reproduction of the image from which the hologram was originally made.

6 Claims, 4 Drawing Figures

THREE-DIMENSIONAL PROJECTION SYSTEM

BACKGROUND OF THE INVENTION

1. Field of the Invention

This invention relates to optical projection systems, and particularly to a system which enables a viewer to perceive all three dimensions of an enlargement of a three-dimensional object or recorded scene.

2. General Description of the Prior Art

There have been several attempts in the past to reproduce images in three dimensions. The first known one utilized stereopsis wherein the eyes of a viewer separately viewed two photographs taken from slightly different angles. Several methods have been used in the past utilizing this approach for projecting three-demensionally appearing movies on a large screen for audience viewing. One of these methods utilized two images projected onto a screen, one being filtered red and the other filtered blue. The viewer would then wear glasses with one lens colored red to filter out the red image, and the other lens colored blue to filter out the blue image. Thus, each eye would perceive a different image of the projection, and thus the three-dimensional or stereopsis effect.

Another and similar method separates the images by polarization, one image being polarized perpendicular to the other image, with the viewer wearing glasses with a polarized lens.

A more recent system utilizing the stereopsis effect does away with the glasses, utilizing a lenticular screen which projects two images selectively to different zones of a theater. The limitation of this system is that the viewer may not move his head very far in either direction without losing the stereoptical effect or the image entirely.

Another and still more recent projection system utilizes a cylindrical lens arrangement for the recording and projection of a hologram. While with this system a viewer may move from side to side in a longitudinal plane without losing a parallax effect provided by this system, the effect is limited to parallax in the longitudinal plane, and the final projected image would be the same size as the object from which the hologram is made if no longitudinal distortion is to be introduced. No vertical parallax is achievable with this system, and thus its three-dimensional effect is limited.

SUMMARY OF THE INVENTION

It is an object of this invention to provide a true three-dimensional image which is a magnified image of an actual object or a holographic depiction of such object, the image appearing to a viewer in space between the viewer and the apparatus of this invention. No screen, special or otherwise, is utilized, and the viewer does not require any special viewing devices and may move from side to side over a significant distance without losing the effect or the image. A first and second lens are serially arranged in an optical path from the object, with the second of the lens having a focal length greater than the first. An Arnulf afocal plate is positioned in the optical path in circuit with these lens and is typically adjacent to the second of the lens. The Arnulf plate consists of positive (entrance side) and negative (exiting side) lens pairs, which have a ratio of radii of curvatures equal to the ratio of the focal length of the second of the lens with respect to the first of the lens.

DESCRIPTION OF THE PREFERRED EMBODIMENT

Figure 1:
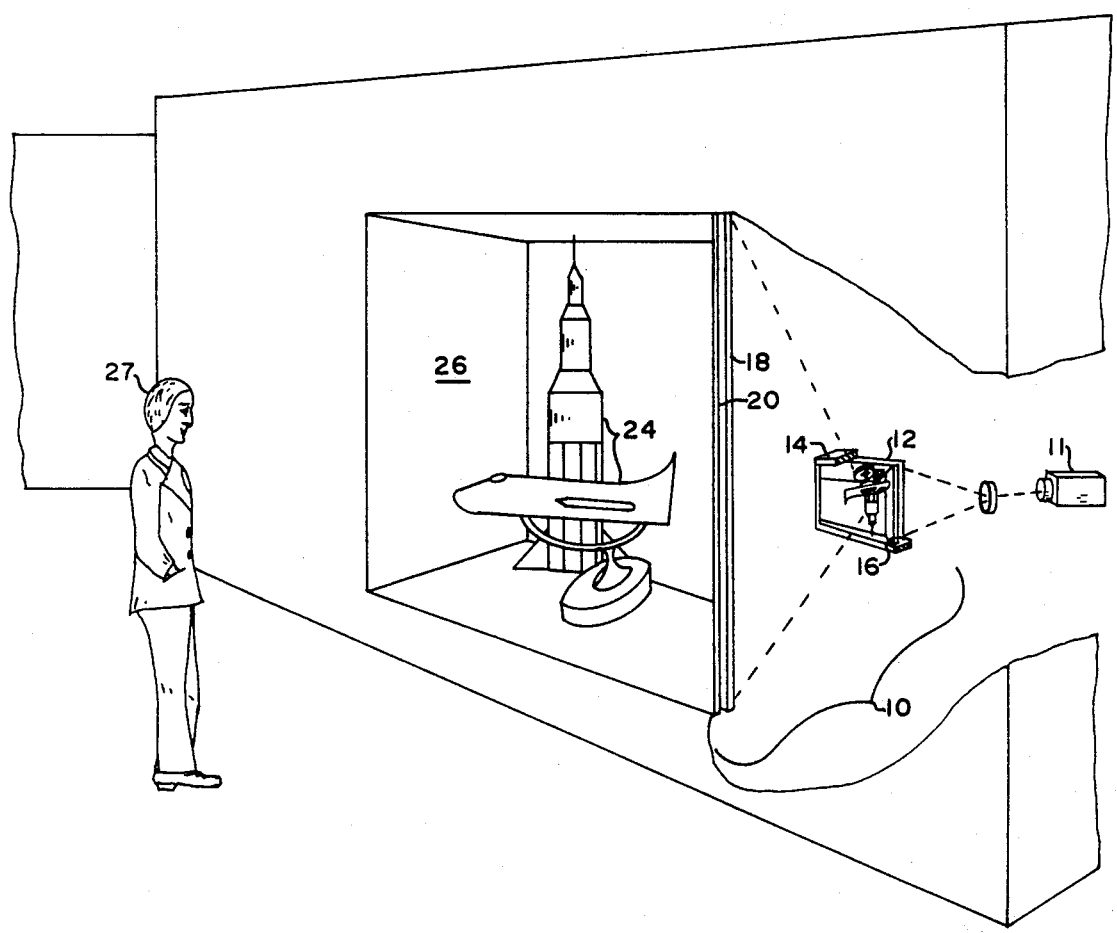
FIG. 1 is a pictorial view of a viewing arrangement as contemplated by the invention.
Figure 2:
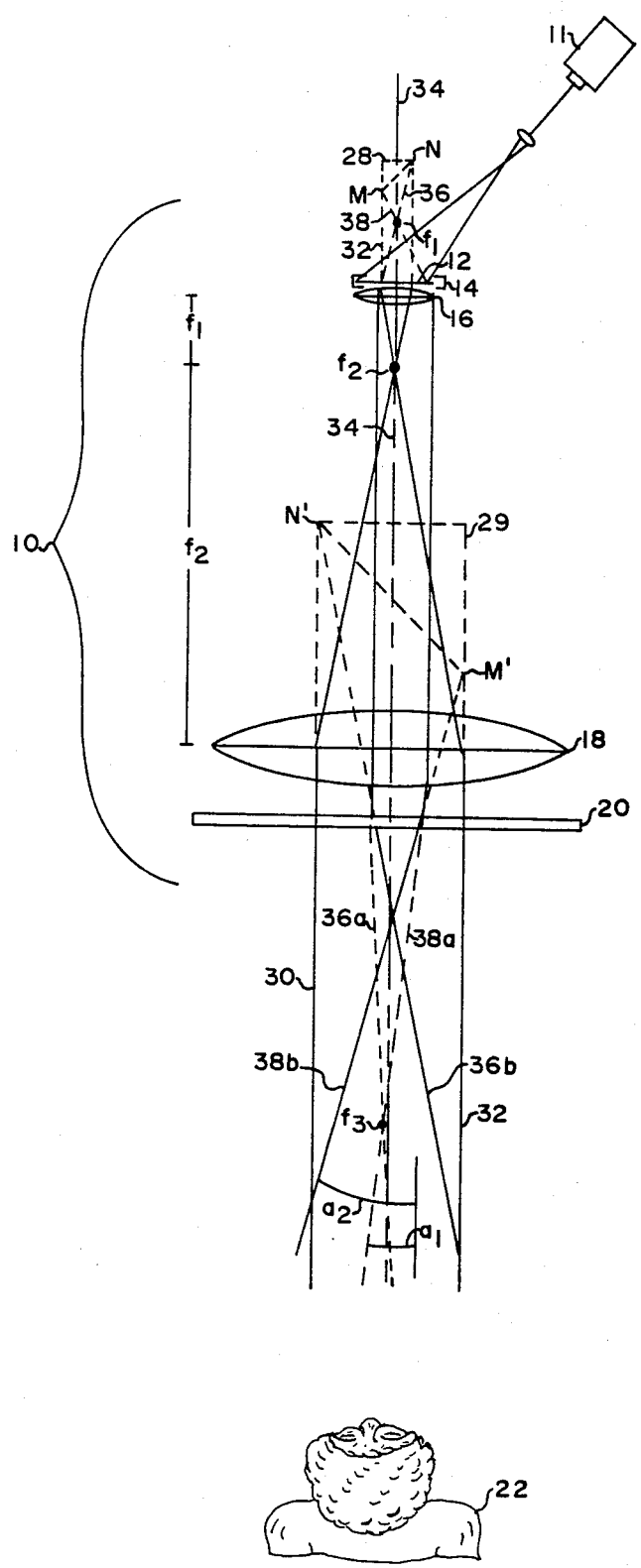
FIG. 2 is a ray diagram illustrating the positioning of components and optical paths through them.

FIG. 10 of FIG. 1 contains the elements of the system identified by brackets 10 of FIG. 2 and includes a holographic transparency 12 illuminated conventionally by a laser 11 (FIG. 1), transparency 12 being held by holder 14. Lens 16, having, for example, a focal length of ten inches, is positioned on a light exiting side of transparency 12. Lens 18 is positioned to receive light from lens 16 and typically would have a focal length of 50 inches, this being five times the focal length of lens 16, and chosen to achieve a magnification of the image on transparency 12 of five times. Lens 18 is positioned in front of lens 16 a distance equal to the combined focal lengths of the lens. Arnulf plate 20 is positioned adjacent to lens 18, typically in front of it, as shown. As a result, it is perceived by a viewer 27 as a magnified three-dimensional real image 24 appearing in a region 26 between viewer 27 and lens 16. A holographic virtual image 28 from transparency 12 is projected and enlarged by the combination of lens 16 and 18 and Arnulf plate 20 and appears as virtual image 29.

For purposes of illustration, a simplified image in the form of a triangular block is substituted in FIG. 2 for the image of a spacecraft 24, shown in FIG. 1. From each of two points, M and N on image 28, a ray pair will be assumed to originate. These rays, rays 30 and 32, travel parallel to optical axis 34 and are directed by lens 16 to focal point $f_2$. Focal point $f_2$ is also a focal point of lens 18; and thus upon reaching lens 18, rays 30 and 32 are directed parallel to the optical axis again. As a result, they reach Arnulf plate 20 normal to the plate, and thus emerge from the other side of it still parallel to optical axis 34.

From each of points M and N, another set of rays 36 and 38 travel through $f_1$ (the focal point of lens 16) and thus emerge from the existing side of lens 16 travelling parallel to optical paths which, if Arnulf plate 20 were not present, would cause these rays (illustrated as rays 36a and 38a) to be directed to a focal point $f_3$, a distance on the exiting side of lens 18 equal to the focal length of lens 18. Instead, however, Arnulf plate 20 diverts rays 36 and 38 along ray paths 36b and 38b, respectively. A viewer 22 then perceives the point N as originating at the apparent intersection of rays 30 and 36b, and he perceives the point M as originating at the apparent intersection of rays 32 and 38b. Arnulf plate 20 increases the path angle $a_1$, with respect to the normal of the Arnulf plate, to the angle of $a_2$. The relationship of $a_1$ and $a_2$ in this particular embodiment of the invention, which corrects for a five times magnification, is that $a_2$ is equal to $5a_1$. The same angular multiplication occurs with respect to ray 36 in the deflection of it from its original path 36a to ray path 36b.

The resolution of the image contained in this system is limited by the lenticules of Arnulf plate 20, the radii of curvature of the lens pairs, and thus they should be made as small and as close together as practical, and the plate should be placed in the optical circuit at a region of the largest image, thus the placement of it adjacent to lens 18. Forming the lenticules in the shape of a hexagon will allow a very close packing of the lens pairs.

The system requires large aperture optics with focal length/diameter ratios of one or less for lens 16 and 18 (aperture of lens 18/aperture of lens 16), and thus Fresnel lens are believed the best choice.

Figure 3:
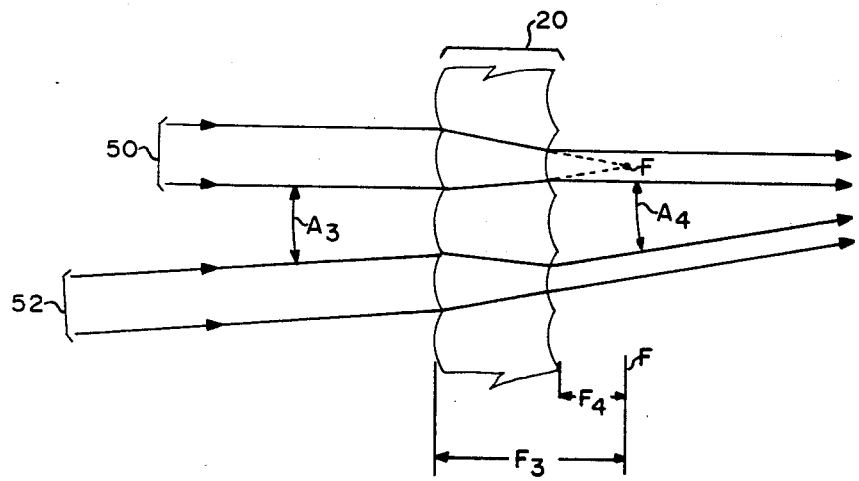
FIG. 3 is a side view of an Arnulf plate and a ray diagram illustrating the passage of rays through the plate.

As suggested above, Arnulf afocal plate 20 is manufactured as a lenticular plate to correct for the specific amount of longitudinal distortion which is introduced in the optical system, noting that the longitudinal magnification of the system (without Arnulf plate 20) is the square of the transverse magnification. To illustrate this, and with reference to FIG. 3, beam 50, which is shown as collimated and normal to Arnulf plate 20, is made thinner by Arnulf plate 20, but emerges from the plate still normal to it. Beam 52, however, enters Arnulf plate 20 at an angle $A_3$ to the normal. The beam is again made thinner, and the angle is increased to $A_4$ as the beam emerges from Arnulf plate 20. The ratio of $A_4$ to $A_3$ is related to the focal lengths of the negative lens $F_4$ with respect to the focal length of the positive lens $F_3$ as follows:

$$A_4/A_3 = F_3/F_4.$$

As shown, the position of the lens focal points $F_3$ and $F_4$ as a pair are referenced to point F. Thus, the lens pair is afocal, having a common focal point. As described above for the present embodiment of the invention, the ratio $F_3:F_4$ is equal to 5:1, which means that Arnulf plate 20 will correct longitudinal distortion of an image with a five times transverse magnification since the longitudinal magnification is decreased to one-fifth of its original value of 25 times (the square of the transverse value), which gives the longitudinal magnification of five times (equal to the transverse value). Thus, the image is magnified by five times in all three dimensions and is no longer distorted.

Figure 4:
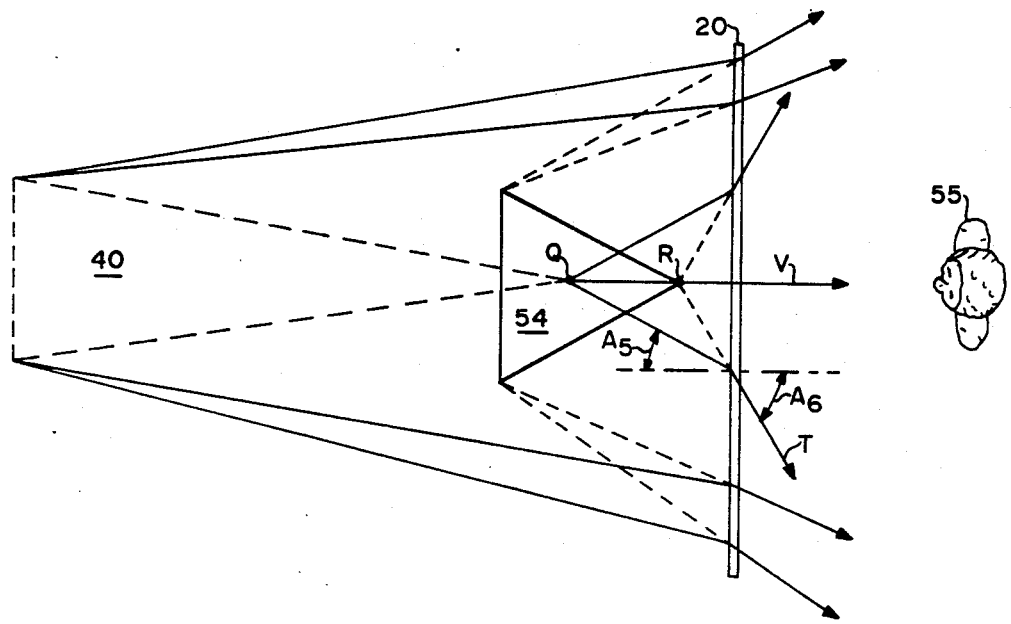
FIG. 4 is a ray diagram illustrating the corrective effect of the Arnulf plate as employed by the present invention.

The effect of Arnulf plate 20 is shown in FIG. 4. Image 40, which is an image of an equilateral triangle of five times transverse magnification and 25 times longitudinal magnification of the original object, is corrected by Arnulf plate 20. Arnulf plate 20 increases angle $A_5$ to an angle of $A_6$ to form beam T. Beam V from point Q strikes Arnulf plate 20 normal to it. Thus, beam V is not deflected by the Arnulf plate. An observer 55 looking from the right side of Arnulf plate 20 will see beams V and T as originating from point R rather than point Q. Thus, the longitudinal distance is decreased to one-fifth of its original value, and image 40 is now seen by the observer as image 54, which has a longitudinal magnification equal to the transverse magnification, both now being five times.

Having thus described my invention, what is claimed is:

1. A projection system for providing a three-demensional image in space suitable for audience viewing comprising:
    imaging means for creating in a discrete first region an optically focusable virtual image, or, alternately, an object;
    first lens means having a first focal length $f_1$, and responsive to said image in said first focal region for projecting said image in a second focal region;
    second lens means having a focal length $f_2$, greater than the focal length of said first lens means, and responsive to the image appearing in said first focal region for projecting an enlarged image in a third focal region; and
    an Arnulf afocal plate positioned in optical circuit with said second lens, and comprising a plurality of positive-negative lens pairs wherein the focal length of a positive lens $f_3$ of a said pair is greater than the focal length of a negative lens $f_4$ of a said pair, and wherein $f_2/f_1$ is equal to $f_3/f_4$, $f_3$ and $f_4$ having the same reference point.

2. A projection system as set forth in claim 1 wherein the distance between said first lens and said second lens is equal to $f_1 + f_2$.

3. A projection system as set forth in claim 2 wherein said Arnulf afocal plate is positioned adjacent said second lens.

4. A projection system as set forth in claim 2 wherein the (aperture of said second lens/aperture of said first lens) is at least as great as $f_2/f_1$.

5. A projection system as set forth in claim 2 wherein said imaging means includes a holographic transparency and laser for illuminating said transparency.

6. A projection system as set forth in claim 2 wherein the ratio of said $f_2$ to $f_1$ is greater than 1.

* * * * *